G. Stricker,
Vehicle.
No. 73,849. Patented Jan. 28, 1868.
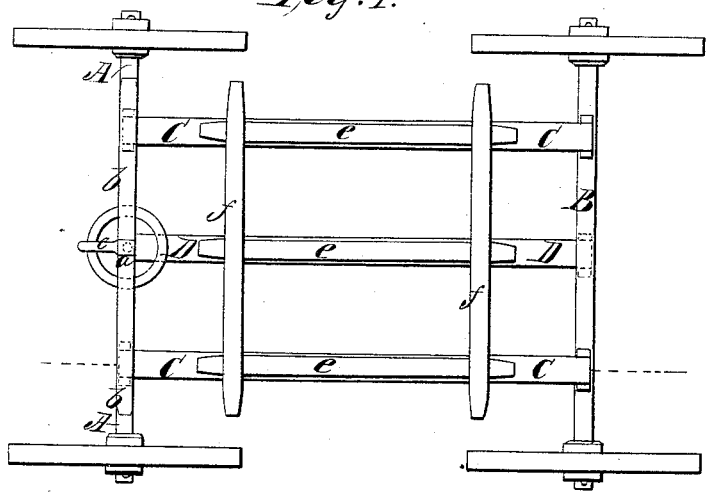
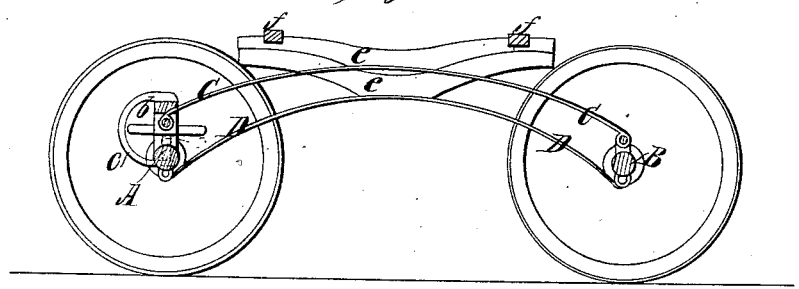
Witnesses.
A. Sellers
J. M. Coombs
Inventor:
G. Stricker
Per Bruce Coombs & Co.
Atty

UNITED STATES PATENT OFFICE.

GEORGE STRICKER, OF CATAWISSA, PENNSYLVANIA.

IMPROVEMENT IN VEHICLES.

Specification forming part of Letters Patent No. 73,849, dated January 28, 1868.

*To all whom it may concern:*

Be it known that I, GEORGE STRICKER, of Catawissa, in the county of Columbia and State of Pennsylvania, have invented a new and useful Improvement in Vehicles; and I do hereby declare that the following is a full, clear, and exact description of the same, reference being had to the accompanying drawings, making a portion of this specification, in which—

Figure 1 is a plan view of a vehicle constructed according to my invention. Fig. 2 is a vertical longitudinal section of the same.

Similar letters of reference indicate corresponding parts in both figures.

This invention consists in a supplemental spring so arranged in relation with the axles, the front cross-bar, and the longitudinal springs of a wheeled carriage as to serve the triple purpose of a reach or connection between the front and rear axles, of preventing any turning of the axles around their longitudinal axes, and of strengthening or supplementing the longitudinal springs hereinbefore mentioned, whereby a strong and easy-riding vehicle is secured, which may, furthermore, be manufactured at a very moderate cost.

To enable others to understand the nature and construction of my invention, I will proceed to describe it with reference to the drawings.

The front and rear axles of the vehicle, furnished with suitable wheels, are shown respectively at A and B, and secured to the front one, A, by a suitable vertical bolt, $a$, is the cross-bar $b$. Secured to each end of this cross-bar is a curved or semi-elliptic spring, C, which extends back, and has its rear end fastened, in any suitable manner, to the corresponding end portion of the rear axle B, at the upper side thereof.

Attached to the central part of the cross-bar $b$ is a casting or metal frame, $c$, the lower portion of which extends underneath the contiguous front axle, and may be connected with the lower extremity of the bolt $a$.

D shows a spring corresponding in shape with the springs C, and the forward end of which is pivoted or attached to the lower part of the casting $c$, and the rear end of which is attached, in like manner, to the under side of the rear axle B. Situated longitudinally upon each of the springs just mentioned is a bar, $e$, upon the ends of which are placed cross-pieces $f$, which serve to support the box of the vehicle.

The central spring D, by connecting the front and rear axles, enables the ordinary reach to be dispensed with; and inasmuch as the spring D is attached to the under sides of the axles, while the springs C are attached at or above the upper sides thereof, it follows that the axles will be prevented from turning by any action of the springs thereon, without the employment of the links ordinarily used in the attachment of longitudinal springs to the axles, and without interfering with the longitudinal thrust of the springs occasioned by the straightening thereof when the vehicle is weighed or loaded down. Furthermore, the aforesaid central spring D, being connected, as hereinbefore mentioned, with the bars $e$ and cross-pieces $f$, supplements, as it were, the other springs C in sustaining the box and other weight placed upon the frame-work just mentioned.

It is designed that the principle of this invention be employed not only in vehicles of large size, as for ordinary traveling, but also for children's carriages and the like.

What I claim as my invention, and desire to secure by Letters Patent, is—

The arrangement of the supplemental spring D and the side springs C, the spring D having its ends attached underneath the axles, and the springs C having their rear ends attached at or above the upper side of the rear axle and their forward extremities to the cross-bar $b$, substantially as and for the purpose specified.

GEORGE STRICKER.

Witnesses:
   B. P. FORTNER,
   JNO. SHARPLESS.